(12) United States Patent
Fjeldstad et al.

(10) Patent No.: US 6,558,851 B1
(45) Date of Patent: May 6, 2003

(54) OPTICAL MEDIUM FOR REGISTRATION OF HOLOGRAPHIC INTERFEROGRAMS

(75) Inventors: John Petter Fjeldstad, Sandefjord (NO); Irina Evgenievna Fjeldstad, Sandefjord (NO); Leonid Mikhailovich Lobanov, Kiev (UA); Vjacheslav Avtonomovich Pivtorak, Kiev (UA); Nikolay Georgievich Kuvshinsky, Kiev (UA); Dmitriy Demyanovich Mysyk, Donetsk (UA); Nikolay Aleksandorvich Davidenko, Kiev (UA); Leonid Ivanovich Kostenko, Donetsk (UA)

(73) Assignee: Holo Tech A.S., Sandefjord (NO)

( * ) Notice: Subject to any disclaimer, the term of this patent is extended or adjusted under 35 U.S.C. 154(b) by 0 days.

(21) Appl. No.: 09/584,470

(22) Filed: Jun. 1, 2000

(30) Foreign Application Priority Data

Oct. 28, 1999 (NO) .......................... 19995273

(51) Int. Cl.$^7$ ................................ G03H 1/02
(52) U.S. Cl. ............... 430/1; 430/2; 430/394; 359/1; 359/3; 359/4; 359/6; 359/24; 356/374
(58) Field of Search ............... 356/374; 430/1, 430/2, 394; 359/1, 3, 4, 6, 24

(56) References Cited

U.S. PATENT DOCUMENTS

| | | | | |
|---|---|---|---|---|
| 3,864,126 A | * | 2/1975 | Nishide et al. ............... | 96/1.5 |
| 4,033,181 A | * | 7/1977 | Oeser ..................... | 73/88 A |
| 5,166,016 A | | 11/1992 | Badesha et al. ............. | 430/56 |
| 5,185,208 A | * | 2/1993 | Yamashita et al. ........ | 428/411.1 |
| 5,336,577 A | | 8/1994 | Spiewak et al. ............. | 430/59 |

FOREIGN PATENT DOCUMENTS

EP  0550161  7/1993
RU  972467  8/1980

(List continued on next page.)

OTHER PUBLICATIONS

Belonozhko et al. "The optimization of information properties..." Zh. Nauchn. Prikl. Fotogr. Kinematogr. vol. 34(1) pp. 58–60.*

Belonozhko et al., Control of the parasitic memory level in the carbazole–containing polymer semiconductors. Zh. Nauchn. Prikl. Fotogr. Kinematogr. vol. 33(6) pp. 453–454.*

(List continued on next page.)

*Primary Examiner*—Martin Angebranndt
(74) *Attorney, Agent, or Firm*—Birch, Stewart, Kolasch & Birch, LLP

(57) ABSTRACT

This invention relates to the photo-sensitive thermoplastic top-layer of optical media for registration of holograms, where the media consists of three transparent layers where the bottom layer is a glass substrate, the mid layer is an electro-conductive film of tin dioxide, and the top layer is a thermoplastic photo-sensitive amorphous molecular semiconductor film made of a matrix which has donor properties and forms transport bands for holes, and were the matrix is doped with;

a photo-sensitive substance (CICT) that has intramolecular physically separated parts with donor and acceptor properties, respectively, and which creates an intramolecular electron-hole pair when absorbing a light quantum, and which has a HOMO-level which is below the HOMO-level of the matrix substance, and a substance with acceptor properties that forms transport bands for electrons, which has a similar ring structure as the acceptor part of CICT to ensure a barrierless transfer of excited electrons from CICT to acceptor-molecules and which has attached a large hydrocarbon chain in order to enhance the plasticity of the film and to provide steric hindrance for the formation charge transfer complexes between acceptor and matrix molecules.

14 Claims, 1 Drawing Sheet

FOREIGN PATENT DOCUMENTS

| RU | 1228672 | | 12/1984 |
|---|---|---|---|
| RU | 1441718 | | 3/1987 |
| RU | 1743300 | | 11/1989 |
| RU | 1768044 | | 1/1991 |
| RU | 1729227 | * | 5/1995 |
| SU | 726492 | * | 4/1980 |
| WO | WO 9821521 | | 5/1998 |

OTHER PUBLICATIONS

Sokolov, et al., "Spectral photosensitivity . . . " Fundament. Osnovy. Optich. Pamyati i Sredy vol. 12. pp. 130–134.*

Abstract of Blaya et al. "Highly Sensitive photopolymaterial dry film for . . . " Applied Physics Letters vol. 73 (12) pp. 1628–1630 (1998).

Abstract of Kadashchuk et al., "Geminate recombination of long lived . . . ", Phys Solid State vol. 39 (7) pp 1047–1051 (Jul. 1997).

Abstract of Fitzpatrick et al., "A comporsion of pulsed Us.Cw . . . ", Proc. SPIE, vol. 3486 pp 131–143 (1998).

SU 1441718 A1 (Kostenko et al.), 27. Feb. 1995 (Sammendrag) World Patents Index (Online). London, U.K.: Derwent Publications, Ltd. (Hentet 2000–09–14). Hentet FRA: Dialog Information Services, Palo Alto, CA USA WPI Accession NR. 1995–274125/199536. (Abstract only).

Abstract of Davidenko et al. "Photoconductivity Features of Amorphous . . . ", Journal of Information Recording. vol. 22(4) pp. 327–338 (1996).

Abstract of Davidenko et al. "Peculiarities of generation and dissociation . . . " Journal of Information recording Materials, vol. 21 (2), pp 185–197 (1993).

SU 1228672, Feb. 9, 1995, Database WPI, Section Ch, Week 199536, Derwent Publications Ltd., London, ; AN 1995–274044, XP002901539.

SU 1743300, Aug. 27, 1995; (AS UKR Phys Org Chem Coal Chem Inst Et Al) Abstract.

Abstract 163436a, May 1, 1989, Belonozhko AM et al: "The optimization of information properties of polymeric semiconductor films".

N. A. Davidenko et al., Adv. Mater. Opt. Electron, vol. 8, pp. 201–209 (1998).

Summary of cited documents in Norwegian Search Report 1999/5273.

Mysyk et al. 'Electron acceptors of the Fluorene series . . . ' J. Org. Chem., vol. 64(19) pp. 6937–6950.*

Ong et al. 'Spectrophotometric and thermodynamic . . . ' J. Phys.Chem., vol. 76(15) pp. 2102–2104.*

Abstract of Belonozhko et al. "The optimization of information properties . . . " Zh. Nauchn. Prikl. Fotogr. Kinematogr. vol. 34(1) pp. 58–60.*

Abstract of Malakhova et al., Photothermoplastic films with . . . , . . . Zh. Nauchn. Prikl. Fotogr. Kinematogr. vol. 36(6) pp. 444–451.*

Abstract of Sokolov, et al., "Spectral photosensitivity . . . " Fundament. Osnovy. Optich. Pamyati i Sredy vol. 12, pp. 130–134.*

* cited by examiner

OPTICAL MEDIUM FOR REGISTRATION OF HOLOGRAPHIC INTERFEROGRAMS

FIELD OF INVENTION

This invention relates to the photo-sensitive thermoplastic top-layer of a media for registration of optical holograms in the holographic interferometry technique and devices. Certain compositions and novel compounds for the photo-sensitive thermoplastic media are disclosed. Such layers are often referred to as amorphous molecular semiconductor (AMS) films.

BACKGROUND

Optical holographic interferometry technique is well suited for non-destructive testing of internal defects in blocks and units of machines and devices, welded seams, as well as measuring stresses of an object during the object's work load and residual stresses caused by technological processes of welding, forging, soldering etc. These applications are useful for fields such as offshore oil industry, shipping industry, process industry, air industry, and all types of constructions where strength is vital or fatigue may cause a problem.

In simple terms, the principle of non-destructive testing by holographic interferometry technique can be described as follows: First a hologram of an investigating area of the object is made. Then the object is exposed to a weak load in order to create stresses in the investigation area of the object. Further, the illumination of the registering medium containing the developed holographic image of the investigating area of the object with the reference beam, and illumination of the same area exposed to the load with the object beam are performed simultaneously. This occurs in such a way, that two light waves will be simultaneously behind the recording medium. One of which is created by illuminating the recording medium (containing the developed image) by the reference beam and which corresponds to the light wave scattered from the object during illumination by the object beam before loading, and the other corresponds to the light wave scattered by the studied object exposed to the load. As a result of the interference between these two light waves, an interferogram of the studied area is formed, and interference fringes localised on the object can be observed. An abnormal behaviour of the interference fringes gives evidence of the presence of a defect. One can estimate the size of the defect from the size of the region where the abnormal interference fringes are observed. Residual stresses are revealed and evaluated in a similar manner. The only difference is that in this case, a release of stresses in the investigation spot are performed instead of loading the object by drilling a small and shallow hole.

The recording of a hologram will typically be performed as follows: In the case when the registering medium consists of three layers: a glass substrate (first layer), a transparent electric conducting layer (second layer), and an AMS-film (third layer). First, the surface of the AMS-film is charged with positive ions by corona discharge. Then the hologram of the investigating area of the object is formed on the charged AMS-film surface. For this aim, the laser beam is divided by a splitter in two parts, one of them (let us denote it as reference beam) is directed to the charged surface of the AMS-film; and another one (denoted as object beam) is directed to the investigating area of the object in such way that having reflected from this area, it is directed to the charged surface of the AMS-film as well. The reference and the object beams are interfered and form the holographic image of the studied object, i.e. the spatial light intensity distribution on the charged surface of the AMS-film. The carrying spatial frequency of this distribution is determined by the angle between the reference and the object beams on the charged surface of the AMS-film, and the spatial frequency band is determined by the angle size of the investigated area of the object. Free electrons and holes are photo-generated in the AMS-film due to the light of the holographic image and the strong electric field (due to the film charging). The electrons migrate to the positively charged surface and neutralise the positive ions, and the holes migrate in the opposite direction are removed from the bulk film by passing into the transparent electro-conducting sub-layer. The latent electrostatic image of the hologram is formed on the charged surface of the AMS-film during the exposure time (the time when the charged surface of the AMS-film is exposed to the holographic light pattern). The latent image is the surface charge distribution and is proportional to the light intensities of the hologram image, but phase shifted by 180°. The variable spatial components of the charge density on the charged film surface results in appearance of the variable normal and tangential forces applied to the surface of the AMS-film. In other words, the latent image of a hologram can be considered as distribution of normal and tangential forces applied to the film surface. The electrostatic image is developed by heating the AMS-film up to the temperature of its transition into the viscous-flow state by means of passing an electric current pulse through the conducting tin dioxide sub-layer. When this takes place, the normal and tangential forces of the latent electrostatic image deform the AMS-film surface and the latent electrostatic image is transferred into a geometrical relief of the surface, which spatial distribution corresponds to the spatial light intensity distribution in hologram image. The heating of the AMS-film terminates at the end of the current pulse, and the geometrical relief becomes fixed. The created geometrical relief is a developed holographic image of the investigated object. When the registering medium with developed holographic image is illuminated by the reference beam, the holographic image of the investigated object is restored due to the diffraction of the beam by the geometrical relief of the surface.

STATE OF THE ART

As mentioned, this invention relates to a holographic registering medium based on amorphous molecular semiconductor films (AMS-films). Such a holographic medium is typically a flat piece made up of three transparent layers; a lower supporting layer made of glass, an intermediate layer of an electric conducting substance, and a top layer consisting of a thermoplastic photo-sensitive AMS-film. The intermediate layer is employed as an electric heat element for heating the top layer during the developing process, while the top layer is serving as the registering film.

Photo-sensitive AMS-films must possess at least four properties in order to be able to register holographic images. The film must be thermoplastic, it must provide physically separate transport bands both for holes and electrons, and it must provide centres for photo-generation of electron-hole pairs. The thermoplastic property is often ensured by employing a thermoplastic substrate which has good film forming properties as the film forming basis (let us denote this substrate as substance P). The transport bands for holes is provided by adding a substance which has good donor properties (substance D) and the transport bands for electrons is provided by adding a substance that has good acceptor properties (substance A). The centres for photo-generation is in conventional AMS-films provided by charge-transfer-complexes or exciplexes (these terms will be defined later). The centres for photo-generation of electron-hole pairs will be denoted as substance F.

Let us take a more detailed look of how the light intensity distribution above the film surface is transferred into an electrostatic image: When a light quantum is absorbed by a F-substance in the AMS-film it becomes excited, which results in a probability that a hole may escape from the F-molecule to a D-molecule and an electron may escape to an A-molecule. If this takes place, a Coulombically bonded electron-hole pair is created. Further, there is a probability that due to the influence of the applied high electric field, charge carriers of the electron-hole pair will not return back to the F-molecule, but would instead dissociate into free charge carriers (free electron and hole). The applied electric field (due to electric charges at the film surface), will cause the free electron to migrate in the electron transport band (manifold of A-molecules) up to the film surface and neutralise one of the deposited positive charges, and cause the free hole to migrate in the hole transport band (manifold of D-molecules) towards the conducting sub-layer where it will be eliminated from the AMS-film when reaching the sub-layer.

There are two important factors which controls these events. First there should be applied a strong electrical field for ensuring an efficient dissociation of the photo-generated bonded electron-hole pairs and a good driving force for the free charge carriers in the film. Second, the electron and hole transport bands are formed by different molecules and they are therefore separate in space. This means that the photo-generation centres also should contain spatially separated donor and acceptor parts in order to ensure that the absorption of a light quantum at the photo-generation centre would strongly lead to a spatial separation of an electron and a hole. If this takes place, an electron may transfer from the acceptor part of the F-molecule to an A-molecule (into the electron transport band) and a hole may transfer from the donor part of the F-molecule to a D-molecule (into the hole transport band), and thus create a Coulombically bonded electron-hole pair.

In most of the relevant prior art, the P and D-substance are implemented in one single substance, for instance in poly (N-vinylcarbazole) and different carbazole containing co-polymers. These compounds have good film-forming properties. In addition, they contain large conjugated pi-systems (carbazole group) that provide the donor properties and thereby form the transport band for holes. Similarly, it is common to employ a derivative based on a di-, tri-, or tetranitrofluorene group as the electron acceptor molecule and transport band for electrons. But there are of course many other molecules which have acceptor properties and can be employed as an A-substance.

The best known types of photo-generation centres are charge transfer complexes (CTC) and exciplexes. A CTC type photo-generating centre is a complex which forms between a molecule with donor and a molecule with acceptor properties. When such molecules come sufficiently close to one another, about 4 Å, there is a probability that an electron from a D-molecule spends some time on an A-molecule and thus forming a weak covalent-like bond or a complex compound which normally absorbs in the visible range. When CTC absorbs a light quantum, a complete transfer of the electron from the D to the A-molecule occurs. An exciplex is a similar type of photo-generating centre. However, in contrast to CTC, the photo-generation of bonded electron-hole pairs by exciplexes is a two-photon process. The exciplex is formed between a D-molecule and a dye-molecule as follows: First, a dye-molecule absorb a light quantum (first photon) and achieves acceptor properties in the excited state. Next, a CTC-complex, which is called an exciplex, is formed between the excited dye-molecule and a D-molecule. The exciplex is able to absorb light in the visible range. In order to create (photo-generate) a bonded electron-hole pair, the exciplex has to absorb a second light quantum (second photon) and become excited. The excited state of the exciplex corresponds to a complete transfer of the electron from the D-molecule to the excited dye-molecule. Further, for creation of a bonded electron-hole pair, it is necessary that at least one of the charges, electron or hole, is passed from the exciplex to the nearest molecule in the corresponding transport band.

Both the above described types of photo-generation have however two essential drawbacks; the absorption coefficient is very small and the probability of charge recombination in the bonded electron-hole pair is high. The low absorption coefficient is due to low probability of tunnel transition of an electron from the D to the A-molecule in a CTC. In turn, this is determined by; a) a weak wave-function overlapping between HOMO-level of the D-molecule and LUMO level of the A-molecule as is evidenced by the very weak covalent-like bond between D and A-molecules, and b) a relatively large separation distance between A and D-molecules. The low absorption coefficient of the CTCs results in that only 3–5% of the incoming light becomes absorbed by the recording media which employ CTCs as photo-generating centres at optimal concentration of P and D-molecules and AMS-film thickness. The high probability of charge carrier recombination in the bonded electron-hole pair is determined by a high probability for return transition of these charges (both electron and hole) back to the photo-generating centre where they easily recombine. This is due to the following: Usually a CTC is formed by A and D-molecules which also may function as transport bands. As mentioned, during creation of a bonded electron-hole pair, an electron passes from the A-molecule of the excited CTC to a similar neighbouring A-molecule of the electron transport band, and a hole passes from the D-molecule of the excited CTC to a similar neighbouring D-molecule of the hole transport band. There are practically no potential barriers between neighbouring A-molecules of the CTC and the electron transport band, and between neighbouring D-molecules of the CTC and hole transport band. Thus, the electron and hole can easily return to the CTC and recombine. Probability for recombination depends on the electric field which prohibits the return of the electron and hole to the photo-generation centre, and it reaches about 0.95 at normally applied electric potentials with field strength in the order of $10^6$ V/cm.

From the above, it follows that registering media consisting of P and D-molecules and which employ CTCs as photo-generation centres have very low holographic sensibilities, in the order of 10 $m^2$/J, since they only absorb 3–5% of the incoming light and the probability for recombination is as high as about 0.95. Examples of patent publications with these types of photo-generation are SU-1743300A, SU-1228672A, SU-972467A, SU-1768044A, and EP-550161.

Another important factor determining the holographic sensibility of AMS-film based recording media is the process of developing the electrostatic image into a geometrical relief. As mentioned, the electrostatic image is developed by heating the registering AMS-film up to its transition temperature to a viscous-flow state where the viscosity becomes very small. Then the normal and tangential electrostatic mirror-image forces applied to the film surface will deform it, and thus transfer the electrostatic image into a geometrical relief of the surface. The variable spatial components of the geometrical relief and the electrostatic image are phase coincident, and the carrier spatial frequency and the spatial frequency band of the geometrical relief are equal to the carrier spatial frequency and the spatial frequency band of the electrostatic image, respectively. The film viscosity decrease in the course of heating under the development process has to be very fast in order to prevent relaxation of the electric charges forming the electrostatic image due to enhancement of surface and bulk conductivity of the AMS-film. Thus, it is important to employ compounds in the recording medium which have a good plasticizing behaviour.

The importance of the plasticizing behaviour of the film during the developing of the electrostatic image is demonstrated by SU 1441718 which discloses a recording media where the AMS-film consists of poly(N-epoxypropylcarbazole) (PEPC) doped with 5% n-undecylester of 2,7-dinitro-9-dicyano-methylen-fluoren-4-carboxylic acid (referred to as n-UDDFC). PEPC functions as a combined P and D-substance while n-UDDFC is the A-substance. CTC-complexes serve as photo-generation centres which are formed between n-UDDFC and PEPC molecules. This media is claimed to achieve a photo-sensitivity of 120 $m^2/J$, or in the order of 10 times its previous art. This finding is surprising since the relatively long carbon chain $((CH_2)_{10}CH_3)$ of the n-UDDFC represents a steric hindrance for the formation of the CTC-complexes (the distance between A and D-molecules should only be about 4 Å). Thus one should expect a reduced CTC-formation and therefore a reduced holographic-sensitivity. But this reduction is more than compensated by: a) an improvement of transport properties for electrons due to the part of the n-UDDFC molecules which do not participate in CTC-formation has fully empty LUMO levels which can transport electrons, which results in an increased probability for tunneling transition of an electron between neighbouring n-UDDFC-molecules and consequently to an increase in the electron mobility, and b) an enhancement of the film viscosity decrease rate during heating at the development process due to the enhanced plasticizing properties of A-molecules.

Even though the media disclosed in SU 1441718 has enhanced holographic-sensitivity compared to the other above cited patents, the main problem still remains to be solved. For many practical applications of devices based on holographic interferometry technique, a still higher holographic sensitivity and efficiency of the recording medium is required.

OBJECT OF INVENTION

The main object of the invention is to provide a holographic recording medium that is sufficiently photo-sensitive and plasticizing to be able to perform real-time registering and developing of holographic images during non-destructive testing of materials by holographic interferometry.

It is also an object of the invention to provide a holographic recording medium that shows a holographic sensitivity above 1000 $m^2/J$.

It is also an object of the invention to provide a holographic recording medium that can record holographic images within a total recording time of 3–5 milliseconds.

It is also an object of the invention to provide a holographic recording medium which is thermostable and robust, and which can be employed for at least 1000 recording/erasing cycles before it must be replaced.

SHORT DESCRIPTION OF FIGURES

DESCRIPTION OF THE INVENTION

Figure 1:
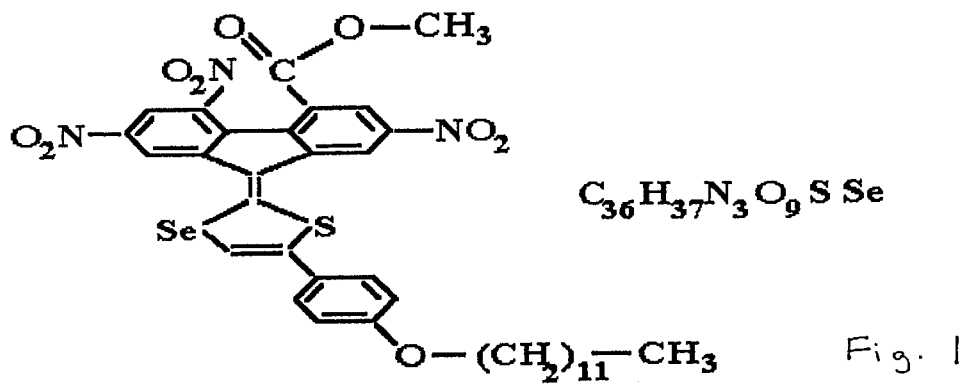
FIG. 1 shows the structural formula of the acceptor compound, hexadecyl-2,7 dinitro-dicyanomethylenfluoren-4-carboxylate (H-DDFC), according to a preferred embodiment of the invention.

The objectives of the invention can be achieved by the media disclosed in the appended claims and in the description of the invention given below.

The objectives of the invention can be achieved by employing an AMS-film where the photo-sensitive compound (F-substance or centre of photo-generation) has internal parts with acceptor and donor properties and which is physically separated by a "bridge" comprising CH-groups, and a compound with acceptor properties which also possesses high plasticizing properties. The photo-sensitive compound functions as the F-substance of the AMS-film. It should have a HOMO-level below the HOMO-level of the D-substance, in order to ensure a potential barrier for back transition of a hole back to the photo-generation centre (F-substance) during the recombination of a Coulombically bonded electron-hole pair. An F-substance where the absorption of a light quantum leads to a total electron transfer from a donor part to an acceptor part, will in the rest be denoted as a CICT (Compound with Intramolecular Charge Transfer). The acceptor compound functions as the A-substance of the AMS-film. The A-substance should have a similar molecular ring structure as the acceptor part of CICT in order to ensure that the LUMO-level of the acceptor part of the CICT coincides with the LUMO-level of the A-substance. This results in a barrierless transfer of the electron between the CICT and A-substance during creation of free charge carriers.

The D-substance applied in this invention is a carbazole containing polymer of conventional type and will not be described further.

CICTs have an absorption coefficient which is at least one order of magnitude larger than that of the CTC-complexes. CICT-molecules are in addition more thermostable than CTC-complexes and do not increase to great extent the dark conductivity of the AMS-film. These properties are very important when the AMS-film is heated during the development of the electrostatic image. The increased thermal stability of CICT enables the AMS-film to be used in a large number of recording/erasing cycles. Another important property of the CICT is that the molecule possess neither donor or acceptor properties in both ground and excited state, and it does not create neither CTC-complexes or exciplexes with A and D-substances.

From the discussion above it is clear that a larger photo-conductivity of the AMS-film is necessary for ensuring a high holographic sensitivity of the recording medium. The larger photo-conductivity of AMS-films according to this invention is achieved by employing CICT-molecules acting as photo-generation centres, due to their higher absorption coefficient compared to CTCs and exciplexes (by approximately one order of magnitude) as well as to the very low probability of charge recombination in bonded electron-hole pairs generated by CICT-molecules.

Let us consider this more closely: As mentioned, the absorption of a light quantum by a CICT-molecule leads to a complete transfer of an electron from its donor to its acceptor part, or the creation of an intramolecular electron-hole pair. In order to contribute to the photo-conductivity, the electrons and holes must escape from the excited CICT-molecule to the neighbouring A and D-molecule, respectively. The concentration of D-molecules in an AMS-film is normally one order of magnitude larger than the concentration of A-molecules, which leads to a much higher probability for a hole escape from CICT to a D-molecule than for an electron to escape to an A-molecule. As soon as the hole has escaped from the CICT to a neighbouring D-molecule, a bonded electron-hole pair is created. This is the process which we call the photo-generation of a bonded electron-hole pair by a photo-generation centre. The photo-generated electron-hole pair can now either dissociate into a free charge carriers under the applied high electric field or to recombine (hole and electron return to the CICT-molecule and recombine). The low probability of recombination of bonded electron-hole pair in the case of employing CICT-molecules as the photo-generation centres is due to the low probability for the return of the hole to the CICT-molecule, since this hole return is hindered by a potential barrier. The potential barrier is provided by the lower HOMO-level of the CICT-molecule (to which the hole is to be returned) than the D-molecule (from where the hole is to be returned). The photo-generation of free charge carriers is not limited only by formation of bonded electron-hole pairs, but also by the dissociation of the bonded pairs in the transport bands. This occurs as follows: The hole and electron moves gradually away from each other in their corresponding bands due to the influence from the applied strong electric field. During this process, the Coulomb forces becomes weaker with increasing distance between the charges. As soon as the distance between the charges is sufficient to reduce the Coulomb attraction energy to kT, the electron and hole are considered to be free charge carriers.

It is important to avoid that A and D-molecules in the film forms CTC-complexes when CICTs are employed as photo-generation centres, since the only practical consequence of CTC-formation is a reduced content of available (free) A and D-molecules to form transport bands for electrons and holes in the film. The probability for CTC-formation can be hindered to a considerable extent by adding a relatively long hydrocarbon chain of CH-groups to the acceptor molecule. This long hydrocarbon chain will, on one hand, cause a steric hindrance for the formation of CTC-complexes, and one the other hand, also give enhanced plasticizing properties to the A-substance. Improved plasticizing properties of the A-substance are very welcome since they allow the enhancement of the rate of viscosity decrease during heating of the AMS-film (during the development process) and a decrease of the developing time.

Thus in summary, the essence of this invention becomes: The problems with low holographic sensitivity and long total time consumption for the registration and development of holograms, has been solved by employing an AMS-film of a conventional carbazole-containing matrix (which has donor properties and functions as transport band for holes) doped with a compound with internal acceptor and donor parts which are separated by a conjugated bridge of CH-groups (functioning as the photo-generation centre), and with a compound which has acceptor properties (functioning as transport band for electrons and plasticizer of the film) which has a similar structural formula as the acceptor part of the photo-generation centre and which is sterically hindered from forming CTC-complexes with carbazole groups of the matrix.

Example of Preferred Holographic Media

After substantial testing of different compounds, the inventors found that an AMS-film with a copolymer of N-epoxypropylcarbazole (EPC) with 5 wt % buthylglycedil ether (BGE) as the matrix doped with 3–5 wt % methyl-9-(4-dodecyl-oxyphenyl-1,3-selenathiol-2-ylidene)-2,5,7 trinitrofluoren-4-carboxylate (MDOSTFC) and 1–5 wt % hexadecyl-2,7 dinitro-dicyanomethylenfluoren-4-carboxylate (H-DDFC) shows excellent results.

The structure of the MDOSTFC molecule is shown in FIG. 1. From the figure, it can be seen that MDOSTFC contains two internal ring structures which is separated by a CH=CH bridge. The upper ring structure is a fluorene group which is the internal part with acceptor properties, while the lower ring structure has donor properties and is composed of a selenathiol and oxyphenyl ring (the lowest ring structures on the figure). MDOSTFC is the centre for photo-generation of bonded electron-hole pairs. When a light quantum is absorbed by MDOSTFC, the total electron transfer from the donor to the acceptor part occurs, and an intramolecular electron-hole pair is created. In order to create an intermolecular Coulombically bonded electron-hole pair, at least one of the charge carriers must be transferred from the excited centre of photo-generation to a neighbouring molecule (one of a corresponding transport band).

Figure 2:
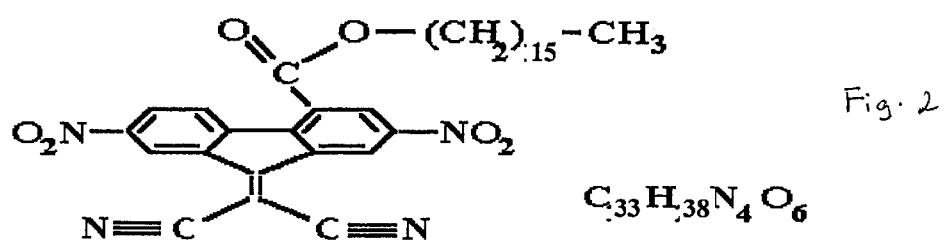
FIG. 2 shows the structural formula of the compound functioning as the photo-generation centre, methyl-9-(4-dodecyl-oxyphenyl-1,3-selenathiol-2-ylidene)-2,5,7 trinitrofluoren-4-carboxylate (MDOSTFC), according to a preferred embodiment of the invention.

The structure of the H-DDFC molecule is shown in FIG. 2. The figure shows clearly that the ring structure of H-DDFC is the same as the acceptor part of MDOSTFC. This ensures that the LUMO level of H-DDFC coincides with the LUMO level of MDOSTFC, and thus enabling a barrierless transfer of an electron from the acceptor part of the exited CICT (MDOSTFC) to a H-DDFC-molecule which form the transport band for electrons. Another feature of H-DDFC is the long chain of CH-groups, which gives sufficient steric hindrance to practically eliminate all CTC-formation between carbazole groups and H-DDFC-molecules. This is an important feature which distinguishes H-DDFC from n-UDDFC employed in SU 1441718. n-UDDFC is in SU 1441718 employed as participant in photo-generation centres, as well as transport band for electrons, while this invention employs H-DDFC solely as a transport band for electrons and plasticizer of the AMS-film. CTC-formation is unwanted in this invention since H-DDFC molecules tied up in CTC-complexes are unlikely to serve as an electron transport agent in comparison with free molecules which have fully empty LUMO levels. CTCs are much less effective photo-generation centres than CICTs, and one may exclude the CTC-formation for the sake of enhancement of charge transport capacity.

Different samples of AMS-films of the suggested optical medium with the above mentioned components in concentrations ranging from 1 to 10 wt % MDOSTFC and from 1 to 10 wt % H-DDFC were prepared. The matrix was EPC+5 wt % BGE in all samples. The films were prepared as follows: Proper amounts of EPC+5 wt % BGE, MDOSTFC and H-DDFC were solved in toluene. The resulting solutions were then cast on a 40×50 mm glass substrate coated with a transparent conductive sub-layer of tin dioxide with resistance 20 Ohm/square. Then the samples were dried in a vacuum chamber with pressure of 2–10 mmHg at 60° C. for one hour. The thickness of the resulting films were 1,2–1,3 $\mu$m.

Figure 3:
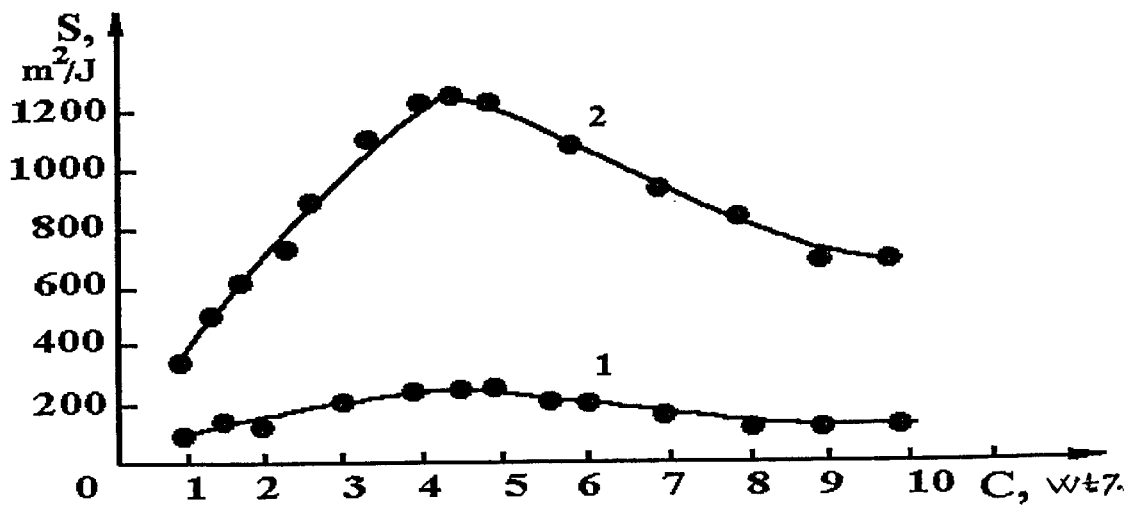
FIG. 3 shows the holographic sensitivity of the AMS-film as a function the film concentration of MDOSTFC when the H-DDFC concentration was kept at zero (curve 1) and as a function of H-DDFC concentration in the film when MDOSTFC was kept at its best value of 5 wt %.

The holographic sensitivity of the samples were measured by the following procedure: First the surface of the sample was charged with positive ions up to a potential of 120–130 V by applying a corona discharge. Then a hologram of a plain wavefront with $\lambda=0,633$ $\mu$m was registered for various exposures without exceeding a maximum of 5% change in the surface potential at the largest exposure. The next step was the development of the electrostatic image by heating the AMS-film. This was performed by employing a potential of 300 V on the tin oxide layer. The diffraction efficiency of the restored holographic image of the plain wavefront was measured continuously during the whole development process, and the process was terminated as soon as the diffraction efficiency reached its maximum. By the results of these measurements and by using the dependence of the diffraction efficiency on the exposure, the holographic sensitivity given as the reciprocal of the exposure correspondent to 1% diffraction efficiency were determined. It should be noted that the development time did not exceed 5 ms for any sample. The results are given in FIG. 3, where curve 1 shows the holographic sensitivity in $m^2/J$ as a function of MDOSTFC concentration when the H-DDFC concentration was kept at zero, and the second curve shows the holographic sensitivity as a function of H-DDFC concentration at the optimal MDOSTFC concentration of 5%. From the figure it is clear that an optimal composition of the optical medium is EPC+5 wt % BGE doped with 5 wt % MDOSTFC and 4 wt % H-DDFC. With this composition a holographic sensitivity of 1200 $m^2/J$ was obtained with recording times of less than 5 ms.

Even though the invention has been explained with reference to an example, it should be understood that the scope of the idea extends further than one single composition of an AMS-film. This invention should be interpreted as a solution to the problem with low holographic sensibilities by employing a photo-sensitive substance with intramolecular charge transfer as the centre of photo-generation of bonded electron-hole pairs, which is combined with (i) an electron transport band forming substance which has the same ring structure as the acceptor part of the photo-sensitive substance in order to ensure a barrierless transfer of the excited electron from the photo-sensitive substance to the electron transport band substance, and (ii) with a hole transport band forming substance (matrix) which has a HOMO level above the HOMO level of the photo-sensitive substance in order to ensure a barrierless transfer of a hole from the excited photo-sensitive substance to the hole transport band on one hand, and to reduce the probability for recombination of charges of the electron-hole pair due to back transfer of the hole to the photo-generating centre (CICT-molecule) on the other hand.

What is claimed is:

1. A medium for recording of holograms of an object, where the medium comprises three transparent layers where the bottom layer is a glass substrate, the mid layer is an electro-conductive film of tin dioxide, and the top layer comprises a thermoplastic photo-sensitive amorphous molecular semiconductor film composed of a matrix which has donor properties and forms transport bands for holes, wherein
the matrix is doped with:
(a) a photo-sensitive substance that has intermolecular physically separated parts with donor and acceptor properties respectively, which creates an intramolecular electron-hole pair when absorbing a light quantum, and which has a HOMO-level below the HOMO-level of the matrix to ensure a low probability for recombination of the charges in the electron-hole pair, and
(b) a substance with acceptor properties that forms transport bands for electrons which has a similar ring structure as the acceptor part of the photosensitive substance to ensure a barrierless transfer of the excited electron from the photo-sensitive substance to the substance with acceptor properties, and which has attached a large hydrocarbon chain in order to enhance the plasticity of the amorphous molecular semiconductor film and to provide steric hindrance for the formation charge transfer complexes between the matrix and the substance with acceptor properties, and wherein:
the matrix comprises N-epoxypropylcarbazole with 5 wt % butylglycidyl ether, the photo-sensitive substance comprises methyl-9-(4-dodecyl-oxyphenyl-1,3-selenathil-2-ylidene)-2,5,7 trinitrofluoren-4-carboxylate and the substance with acceptor properties comprises hexadecyl-2,7 dinitro-dicyanomethylenfluoren-4-carboxylate.

2. A medium according to claim 1, wherein the matrix is doped with 3–5 wt % methyl-9-(dodecyl-oxyphenyl-1,3-selenathil-2-ylidene)-2,5,7 trinitrofluoren-4-carboxylate and 1–5 wt % hexadecyl-2,7 dinitro-dicyanomethylene-4-carboxylate.

3. A medium according to claim 2, wherein the matrix is doped with 5 wt % methyl-9-(dodecyl-oxyphenyl-1,3-selenathil-2-ylidene)-2,5,7 trinitrofluoran-4-carboxylate and 4 wt % hexadecyl-2,7 dinitro-dicyanomethylene-4-carboxylate.

4. A method for the recording of holograms under non-destructive testing of materials by holographic interferometry which comprises (a) preparing a doped matrix according to claim 1, (b) charging the surface of an AMS-film with positive ions by corona discharge, (c) forming a hologram of an area of an object on the charged AMS-film surface with a laser beam, (d) splitting the laser beam into two parts, the first one of which is directed to the charged surface of the AMS-film, and the second one of which is directed to the area of the object in such a way that having reflected from this area, the second beam is directed to the charged surface of the AMS-film as well, whereby the first and second beams are interfered and form the holographic image of the studied object.

5. The method according to claim 4 for the recording of holograms under non-destructive testing of materials by holographic interferometry, wherein the medium is prepared from a matrix doped with 3–5 wt % methyl-9-(dodecyl-oxyphenyl-1,3-selenathil-2-ylidene)-2,5,7 trinitrofluoren-4-carboxylate and 1–5 wt % hexadecyl-2,7 dinitro-dicyanomethylene-4-carboxylate.

6. The method according to claim 5 for the recording of holograms under non-destructive testing of materials by holographic interferometry, wherein the medium is prepared from a matrix doped with 5 wt % methyl-9-(dodecyl-oxyphenyl-1,3-selenathil-2-ylidene)-2,5,7 trinitrofluoren-4- carboxylate and 4 wt % hexadecyl-2,7 dinitro-dicyanomethylene-4-carboxylate.

7. A medium according to claim 1, wherein the matrix is doped with 3–5 wt % methyl-9-(dodecyl-oxyphenyl-1,3-selenathil-2-ylidene)-2,5,7 trinitrofluoren-4-carboxylate and 4 wt % hexadecyl-2,7 dinitro-dicyanomethylene-4-carboxylate.

8. A medium according to claim 1, wherein the matrix is doped with 5 wt % methyl-9-(dodecyl-oxyphenyl-1,3-selenathil-2-ylidene)-2,5,7 trinitrofluoren-4-carboxylate and 1–5 wt % hexadecyl-2,7 dinitro-dicyanomethylene-4-carboxylate.

9. An amorphous molecular semiconductor film for recording holograms where the film forms a layer of a matrix comprising a substance with donor properties which forms transport bands for holes, wherein the matrix is doped with:
(a) a photo-sensitive substance that has intermolecular physically separated parts with donor and acceptor properties respectively, which creates an intra-molecular electron-hole pair when absorbing a light quantum, and which has a HOMO-level below the HOMO-level of the matrix to ensure a low probability for recombination of the charges in the electron-hole pair, and
(b) a substance with acceptor properties that forms transport bands for which has a similar ring structure as the acceptor part of a photo-sensitivesubstance to ensure a barrier-less transfer of the excited electron from the photo-sensitive substance to the substance with acceptor properties, and which has attached a large hydrocarbon chain in order to enhance the plasticity of the amorphous molecular semiconductor film and to provide steric hindrance for the formation charge transfer complexes between the matrix and the substance with acceptor properties, and wherein:

the matrix comprises is N-epoxypropylcarbazole with 5 wt % butylglycidyl ether, the photo-sensitive substance comprises methyl-9-(4-dodecyl-oxyphenyl-1,3-selenathil-2-ylidene)-2,5,7 trinitrofluoren-4-carboxylate, and the substance with acceptor properties comprises hexadecyl-2,7 dinitro-dicyanomethylenfluoren-4-carboxylate.

10. A film according to claim 9, wherein the matrix is doped with 3–5 wt % methyl-9-(4-dodecyl-oxyphenyl-1,3-selenathil-2-ylidene)-2,5,7 trinitrofluoren-4-carboxylate and 1–5 wt % hexadecyl-2,7 dinitro-dicyanomethylenfluoren-4-carboxylate.

11. A film according to claim 9, wherein the matrix is doped with 5 wt % methyl-9-(4-dodecyl-oxyphenyl-1,3-selenathil-2-ylidene)-2,5,7 trinitrofluoren-4-carboxylate and 4 wt % hexadecyl-2,7 dinitro-dicyanomethylenfluoren-4-carboxylate.

12. A method for the recording of holograms under non-destructive testing of materials by holographic interferometry which comprises (a) preparing a doped matrix according to claim 9, (b) charging the surface of an AMS-film with positive ions by corona discharge, (c) forming a hologram of an area of an object on the charged AMS-film surface with a laser beam, (d) splitting the laser beam into two parts, the first one of which is directed to the charged surface of the AMS-film, and the second one of which is directed to the area of the object in such a way that having reflected from this area, the second beam is directed to the charged surface of the AMS-film as well, whereby the first and second beams are interfered and form the holographic image of the studied object.

13. The method according to claim 12 for the recording of holograms under non-destructive testing of materials by holographic interferometry, wherein the medium is prepared from a matrix doped with 3–5 wt % methyl-9-(4-dodecyl-oxyphenyl-1,3-selenathil-2-ylidene)-2,5,7 trinitrofluoren-4-carboxylate and 4 wt % hexadecyl-2,7 dinitro-dicyanomethylenfluoren-4-carboxylate.

14. The method according to claim 12 for the recording of holograms under non-destructive testing of materials by holographic interferometry, wherein the medium is prepared from a matrix doped with 5 wt % methyl-9-(4-dodecyl-oxyphenyl-1,3-selenathil-2-ylidene)-2,5,7 trinitrofluoren-4-carboxylate and 4 wt % hexadecyl-2,7 dinitro-dicyanomethylenfluoren-4-carboxylate.

* * * * *